(No Model.)
A. B. PAUL.
AMALGAMATING ORES AND SANDS CONTAINING GOLD.
No. 285,508. Patented Sept. 25, 1883.
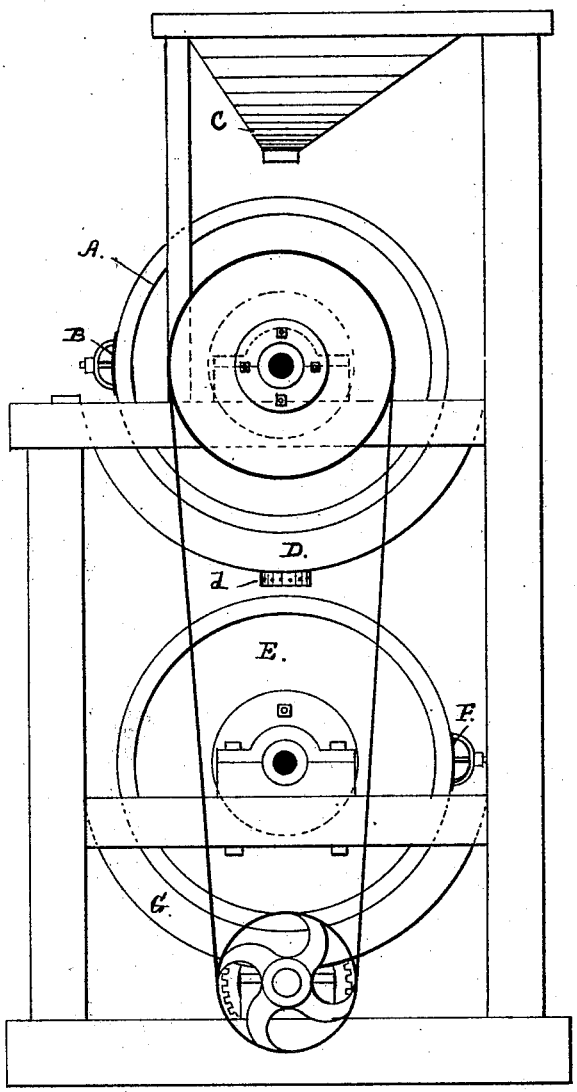
Witnesses:
Geo. A. Dickson
E. Patten.
Inventor:
Almarin B. Paul
By his Atty; Edward J. Adams

UNITED STATES PATENT OFFICE.

ALMARIN B. PAUL, OF SAN FRANCISCO, CALIFORNIA.

AMALGAMATING ORES AND SANDS CONTAINING GOLD.

SPECIFICATION forming part of Letters Patent No. 285,508, dated September 25, 1883.

Application filed May 4, 1883. (No model.)

*To all whom it may concern:*

Be it known that I, ALMARIN B. PAUL, a citizen of the United States, residing in the city and county of San Francisco, State of California, have made and invented certain new and useful Improvements in Amalgamating Pulverized Ores of Gold and Silver and Black Sands Containing Gold; and I do hereby declare that the following is a full, clear, and exact description of my said invention, the accompanying drawing, representing a side elevation of my apparatus, being referred to by letters.

My invention relates to a process of treating black or other sands containing gold, as well as pulverized gold and silver ores, with mercury after they have been subjected to heat to effect amalgamation; and while this process somewhat resembles that described in the Letters Patent granted to myself and J. L. Wood on the 19th of October, 1869, No. 95,931, it differs from that invention and is an important improvement over it, in that the pulverized ore is brought to a state of complete dryness and to a highly-heated condition by treatment in a separate machine, instead of in the amalgamating-barrel, and is not brought into contact with the mercury and put through the amalgamating operation until all moisture is expelled and a temperature of at least 80° Fahrenheit is obtained. That process, moreover, is not adapted for treating black sands containing gold. By this improved process or mode of treating sands containing gold, also pulverized ores, in a dry and highly-heated state, I produce an electrified condition of the ore and metallic particles and a magnetic condition in the mercury brought in contact with them to such a degree that a more rapid as well as a more complete combination of the metals is obtained with a minimum of loss.

The following description fully explains the nature of my improved process and the manner in which I proceed to carry out, apply, and produce it, and also an apparatus which I have devised and employ therein.

In the drawing herein referred to, A represents an amalgamating-barrel, which should be constructed of wood, or should have a wood or earthen lining, in order to retain the heat in the charge of ore as far as practicable. It may have iron flanges and a metal gudgeon at each end; but it should have bearings for its center in glass or wooden boxes and be run by a wooden pulley and a rubber belting. The best form of barrel for this purpose is a wooden cylinder with a gudgeon in the center of each head and a hand hole or opening in the side, closed by a cover which is sealed or packed, so as to be mercury-tight, its length being about equal to or not much greater than its diameter—say in the proportion of five feet to four feet. Such a barrel is mounted in a suitable supporting frame-work immediately under a feed-hopper, C, having a spout in line with the barrel-opening B, and directly underneath the barrel a discharge-trough, D, is fixed to the frame-work in position to receive the contents as they are discharged through the opening B at the end of each operation and direct them into a second and lower cylinder, E, which, for convenience, I place in the same frame-work on horizontal gudgeons, so that it can be rotated from the same shaft as the amalgamating-barrel. This lower cylinder should be larger than the first one—say about one-quarter more capacity—and somewhat larger at the center than at the ends, after the shape of a barrel. The discharge-trough D has an outlet, $d$, in the bottom and a discharge-spout to lead the matter from it into the cylinder E, which has an opening closed by a cover, F, to receive the charge after it leaves the amalgamating-cylinder above.

The sands or ore being reduced to any desired degree of fineness, I first bring it into the required state of perfect dryness and into a heated condition by exposing it to the heat openly upon a drying-pan, floor, or chamber, uncovered, and provided with a suitable heating apparatus, such as furnaces located underneath. All the moisture being driven off during this operation, a temperature of not less than 80° Fahrenheit is obtained in the ore. At the beginning of the process the first charge thus prepared for the amalgamating-cylinder should be hotter than the succeeding ones, so that the loss of heat by contact of the ore with the surface of the cylinder shall not reduce its temperature too much. The degree of heat to which the ore should be brought at this operation is governed by the amount of metal contained in it, and this temperature can be brought up to at least 150° with advantage. This temperature may decrease in proportion as the percentage of metal in the ore increases, as the more metal contained in the charge the longer it will retain its heated condition. A quantity of matter, either pulverized ore or sands, being thus prepared, the cylinder A is supplied through the hopper above with a charge in quantity a little less than one-half the square feet of the interior, after which the opening B is tightly closed and the cylinder slowly revolved for the space of about ten minutes to obtain a uniform condition of heat throughout the charge, and also to shell any films of silicious coating that may exist in the metal particles before introducing the mercury. This being done, the opening B is uncovered and a charge of mercury in a naturally cold state is introduced into the cylinder and the cover replaced and tightly sealed at the joints; or it may be introduced through a separate and smaller aperture. The more mercury used up to twenty-five per cent. of weight of ore the less is the percentage of loss. Any desired chemicals are also introduced at this time. By way of precaution, one trunnion of this cylinder should be hollow and loosely plugged with a wooden plug to prevent accident by accumulation of any gases which might take place through the working of ores of varied combinations. The amalgamating-cylinder A being thus charged, it is then revolved at a speed equal to one hundred and twenty feet per minute for the period of half an hour, (more or less,) according to ore. The heated condition of the precious metals coming in contact with the cold, dry mercury creates instantaneous, or what I term "electric," amalgamation. Not only this, but a magnetic condition is imparted to the mercury, by which, although it may be minutely disseminated all through the ore, yet it will gather with a facility unequaled by any mode of amalgamation. This fact alone is of great economic value above every other mode of amalgamating the precious metals. The sands or ore thus treated and completed is then transferred through the hopper B, to the lower cylinder, E, which, previous to receiving the charge of ore, has been filled two-thirds full of cold water; warm is not objectionable in cold weather. The operation carried on in this cylinder is for the purpose of concentrating the mercury and amalgamated metals. The treatment should be continued for about three-quarters of an hour at a speed equal to eighty feet per minute.

In the process described in the patent granted to J. L. Wood and myself, above referred to, the ore being heated in the closed vessel in which the mercury was to be afterward applied, the moisture and dampness were not driven out and the ores were not dried, so that the action of the mercury was not complete and thoroughly effective, as is the case where the ore is thoroughly dried, as herein described. The ore being heated in the same vessel in which the mercury was afterward applied in the Paul and Wood patent, such vessel must necessarily be metallic, and becomes heated as the ore is heated, and if the mercury is applied while thus heated it will cling to the metallic vessel until heated and broken up, when it will mix with the ores so thoroughly and intimately as to become irreclaimable. If, however, the vessel is allowed to cool, as described in said patent, the ores will cool also, and the mercury, when then introduced, will have to act upon a wet cold mass and the previous heating will have been futile, while in the present invention the ores, being thoroughly dried and warmed or heated to a high degree outside of and separate from the vessel in which they are subjected to the mercury, are then, while thus conditioned, placed in a vessel where the mercury is already in a normally cool state. This vessel being a non-conductor of heat, being formed of wood, the mercury will not cling to it, but will at once be diffused through the ores, and will not be so broken up and disintegrated as to become irreclaimable. The heated dried ores are peculiarly susceptible to the action of the cold mercury, and the amalgamation in the wooden vessel is complete and thorough.

Having thus fully described my invention, what I claim, and desire to secure by Letters Patent, is—

1. The herein-described process or method of treating pulverized ores of gold and silver and sands containing gold to effect amalgamation, consisting of first heating and drying the ores or sands, and then, while thus heated and dried, subjecting them to rotation in a vessel containing mercury at its normal temperature, said vessel being a non-conductor of heat, and it, with its contained mercury, being unheated when the previously dried and heated ores are introduced, as herein set forth.

2. The herein-described process or method of amalgamating pulverized ores of gold and silver and sands containing gold, consisting in first drying and highly heating said ores or sands by a means independent of their subsequent treatment, and while thus heated and dried subjecting them to rotation in a closed vessel which is unheated, and which is a non-conductor of heat, in the presence of mercury introduced at its normal temperature, and finally precipitating this charge of mingled ores (or sands) and mercury from said amalgamating-vessel into a receptacle containing a body of water and subjecting them to a rotating movement therein, as set forth.

3. The herein-described machine or apparatus for amalgamating pulverized ore and sands containing gold, consisting of a suitable frame, the amalgamating barrel or cylinder A, trough D, the concentrating barrel or cylinder E, and the receiving-trough G, and mechanism for imparting to said cylinders a rotary motion upon centers supported in said frame.

ALMARIN BROOKS PAUL.

Witnesses:
EDWARD E. OSBORN,
E. PATTEN.